(12) United States Patent
Metzger

(10) Patent No.: US 7,836,927 B2
(45) Date of Patent: *Nov. 23, 2010

(54) TIRE TREAD PROVIDED WITH INCISIONS

(75) Inventor: Julien Metzger, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 690 days.

This patent is subject to a terminal disclaimer.

(21) Appl. No.: 11/783,414

(22) Filed: Apr. 9, 2007

(65) Prior Publication Data

US 2007/0187014 A1    Aug. 16, 2007

Related U.S. Application Data

(63) Continuation of application No. 10/753,418, filed on Jan. 9, 2004, now Pat. No. 7,201,195, which is a continuation of application No. PCT/EP02/07003, filed on Jun. 25, 2002.

(30) Foreign Application Priority Data

Sep. 7, 2001   (FR) .................................. 01 09111

(51) Int. Cl.
*B60C 11/12* (2006.01)
(52) U.S. Cl. .............................. 152/209.21; 152/209.23; 152/DIG. 3
(58) Field of Classification Search ............. 152/209.21, 152/209.23, DIG. 3
See application file for complete search history.

(56) References Cited

U.S. PATENT DOCUMENTS

| | | | |
|---|---|---|---|
| 2,612,928 A | 10/1952 | Buddenhagen | |
| 3,199,567 A | 8/1965 | Kunz et al. | |
| 3,328,849 A | 7/1967 | Kunz et al. | |
| 3,698,462 A | 10/1972 | Jacobs | |
| 4,705,088 A | 11/1987 | Ghilardi | |
| 5,350,001 A | 9/1994 | Beckmann et al. | |

(Continued)

FOREIGN PATENT DOCUMENTS

EP    0 768 958    1/1996

(Continued)

*Primary Examiner*—Steven D Maki
(74) *Attorney, Agent, or Firm*—Buchanan, Ingersoll & Rooney PC

(57) ABSTRACT

Tire tread including a pattern formed by at two ridges of mean width L, which include a plurality of incisions whose traces on the contact surface extend between two points of intersection A and B, the segment AB making an angle with the transverse direction of the tread at most equal to 40°, the tread wherein each incision, of mean width E, includes a succession of incision portions, some of said incision portions having, on any surface parallel to the contact surface in the new condition and located between said surface in the new condition and ⅔ of the maximum depth of the incision, traces that make an average angle β at most equal to 15° with the longitudinal direction of the tread, said portions having a total length Lt which is at least equal to one-fifth of the ridge width; and in that the incision portions whose traces make an average angle β are provided on their opposite walls with relief elements of amplitude K designed to cooperate with one another to block relative movements between one incision wall and the opposite wall, the amplitude K of said relief elements being between 4 and 10 times the mean width E of the incision.

1 Claim, 3 Drawing Sheets

U.S. PATENT DOCUMENTS

| | | | |
|---|---|---|---|
| 5,783,002 A | 7/1998 | Lagnier | |
| 5,950,700 A | 9/1999 | Fukuoka | |
| 7,201,195 B2 * | 4/2007 | Metzger | 152/209.21 |
| 2002/0053383 A1 | 5/2002 | Kleinhoff et al. | |
| 2002/0139164 A1 | 10/2002 | Ishihara | |
| 2005/0109438 A1 | 5/2005 | Collette et al. | |

FOREIGN PATENT DOCUMENTS

| | | |
|---|---|---|
| EP | 1 234 692 | 8/2002 |
| FR | 1 427 887 | 2/1966 |
| FR | 2 123 329 | 9/1972 |
| GB | 869 980 | 6/1961 |
| JP | 40-1204807 | 8/1989 |
| JP | 2000-025419 | 1/2000 |
| WO | WO 99/48707 | 9/1999 |

* cited by examiner

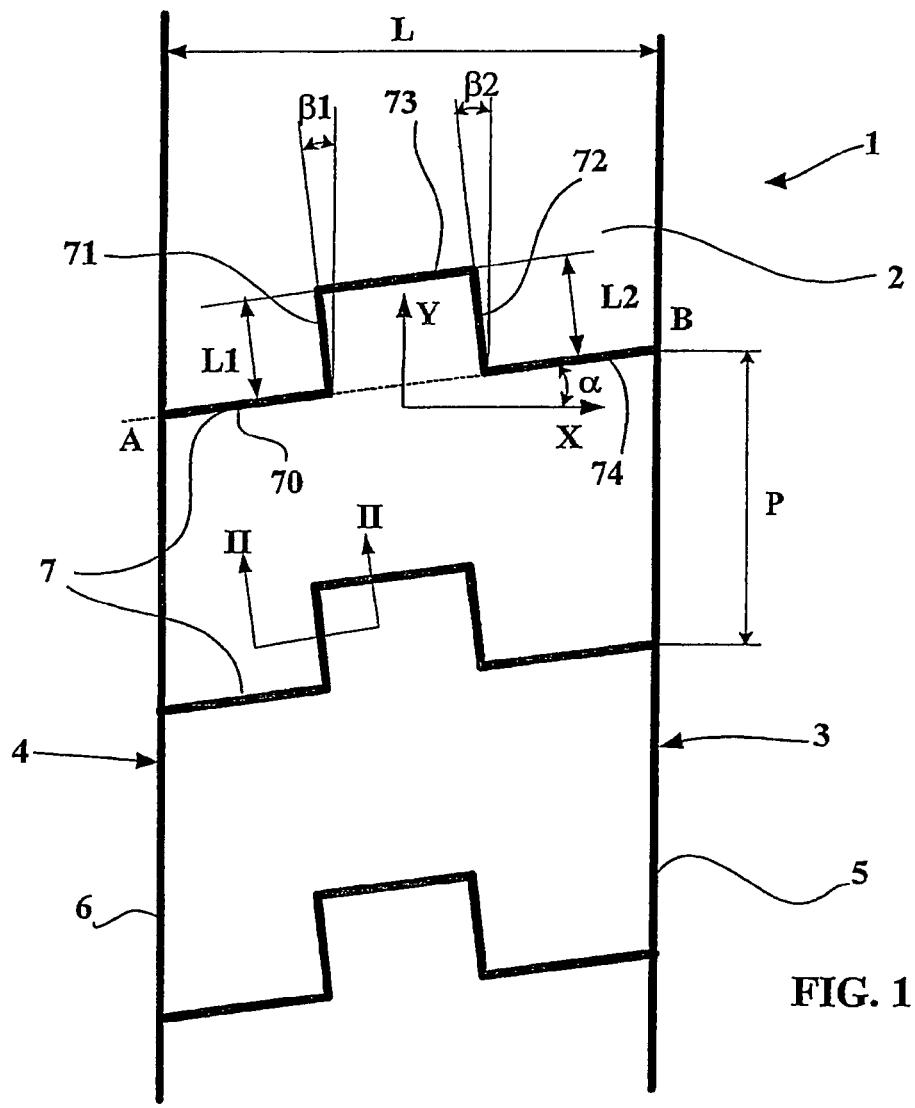
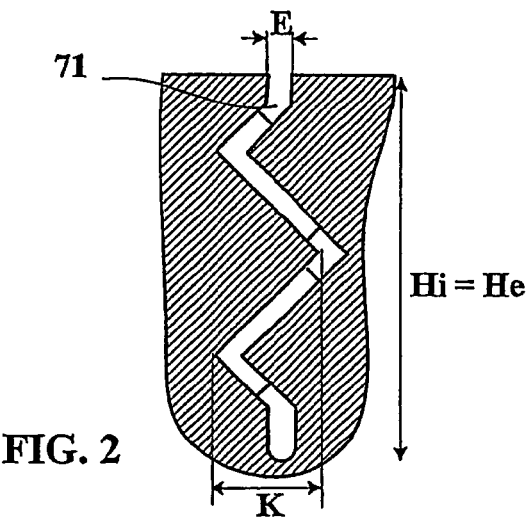
FIG. 1
FIG. 2

TIRE TREAD PROVIDED WITH INCISIONS

The present application is a continuation of U.S. Ser. No. 10/753,418 filed on Jan. 9, 2004, now U.S. Pat. No. 7,201,195 issued Apr. 10, 2007, and which is a continuation of International Application Ser. No. PCT/EP02/07003, filed Jun. 25, 2002, which is incorporated by reference.

FIELD OF THE INVENTION

The invention concerns the treads of tires intended for fitting to the driving axle of vehicles, and more particularly heavy vehicles.

BACKGROUND OF INVENTION

Such a tread is generally provided with a tread pattern formed of relief elements, ridges and/or blocks, separated from one another in the transverse and/or circumferential direction by circumferential and/or transverse grooves. Depending on the axle on which a tire is fitted, its tread is provided with a pattern comprising more blocks or more ridges of generally circumferential orientation. In the case of a driving axle, i.e. an axle to which a driving or braking torque is transmitted, it is customary to produce, rather, patterns that comprise a plurality of blocks delimited by both circumferential and transverse grooves. The major disadvantages of this type of pattern are that the pliability of the tread is increased (reduction of the shear rigidity under a force tangential to the surface of the relief elements passing through the contact zone) and that the noise emission during rolling increases with the amount of grooving (ratio between the areas of grooves and the total area of the tread).

Another possibility consists in producing a pattern formed of ridges with generally circumferential orientation (i.e. which can zig-zag either side of that direction) and providing these ridges with a plurality of incisions whose width is small compared to the width of the grooves (as a general rule, the average width of the incisions is at most 2 mm); these incisions may or may not be oblique relative to the transverse direction of the tire, and may extend through part or all of the useful thickness of the tread (by definition, the useful thickness corresponds to the thickness of tread that a user can use while still complying with the legal prescriptions in force). Although the presence of these incisions favors road grip due to the presence of the numerous edges that they form on the rolling surface of the ridges, an increase of their number also reduces rigidity, which is detrimental to the tire's other performance characteristics, this reduction of rigidity being in part associated with the ability of the opposite rubber walls that delimit each incision to slide relative to one another during passage through the road contact zone.

A solution was proposed in particular by the applicant in patent EP 768958, which describes new forms of incisions that substantially reduce the relative sliding between opposite walls, and according to which said walls each have a relief surface formed of projections and concavities arranged on either side of a mean surface, a projection being completely surrounded by concavities and vice-versa, such that the wall surfaces cooperate together to restrict the relative movements between said walls.

In general these incisions are arranged so as to form rubber edges orientated essentially transversely so as to have an effect on the grip of the tire under a driving or braking torque when rolling in a straight line. It has been found that under forces tangential to the contact surface of ridges provided with such incisions, although to be sure the walls are blocked against the opposite walls, this blocking does not become effective instantaneously. During noise measurement tests on heavy vehicles that consisted in applying a driving torque to the driving axle, the applicant found that the larger was the number of incisions of the type described in patent EP 768958, the more perceptible became the noise recorded as the vehicle passed. In fact, there are directions in which there is no blocking between the walls.

The need exists for a tire tread pattern formed essentially of circumferential ridges provided with a plurality of incisions having mean width less than 2 mm, which create a large number and a large length of edges, said incisions delimiting a plurality of rubber elements whose opposite walls are mutually blocked against one another with virtually instantaneous effect (i.e. in a time which is very appreciably reduced or zero).

SUMMARY OF THE INVENTION

To that end, the invention proposes a tread for tires which comprises a pattern formed by at least two grooves of generally circumferential orientation, these grooves delimiting at least two ridges each comprising a contact face intended to come in contact with the road and two lateral faces, said lateral faces intersecting the contact face to form edges, at least one of said ridges, of mean width L, having a plurality of incisions that open onto the contact face and onto the two lateral faces of the ridge, such that the trace of each incision on the contact surface when the tire is new extends between two intersection points A and B with the edges of the ridge, and the direction of the segment AB makes an angle α with the transverse direction of the tread at most equal to 40, said tread being characterized in that:

each incision, of mean width E, comprises between one lateral face of the ridge and its other lateral face a succession of incision portions, some of said incision portions, over at least a total height He equal to half the maximum depth Hi of the incision and for any surface parallel to the contact surface in the new condition and taken within this height He, having traces which make an average angle β at most equal to 15 relative to the longitudinal direction of the tread, and in projection on this longitudinal direction, said portions having a total length Lt which is at least equal to one-fifth of the width L of the ridge; and in that the incision portions whose traces make an average angle β are provided on opposite walls with relief elements of amplitude K designed to cooperate during passage through the road contact zone, to block relative movements between one wall of the incision and the opposite wall in the direction of the tread's thickness and in the longitudinal direction of the tread, the amplitude K of said relief elements being between 4 and 10 times the mean width E of the incision.

The total length Lt is equal to the sum of the lengths of the projections on the longitudinal direction Y of the incision portions which make an average angle of at most 15° with the longitudinal direction Y. This length Lt can be different from one section plane to another section plane, which is equivalent to the fact that from one section plane to another the trace of the incision on the rolling surface evolves.

The mean width E of an incision is defined as the average distance separating its opposite walls.

To obtain the result desired, it is essential to achieve the combination of a sufficient length of incision portions that make a small angle with the longitudinal direction of the tread (corresponding to the circumferential direction when the tread is part of a tire) and the presence of relief elements on those portions to achieve blocking of the walls of said portions in all the directions contained on the surface of said portions, and this over at least a total height He equal to at least two-thirds of the maximum height Hi of the incision. Of course, this height He can be taken as the sum of the heights of several unconnected portions which satisfy the conditions of the invention specified above, namely the conditions of angle and length.

Thus, when passing through the ground contact zone, the ridges provided with incisions according to the invention can be likened to mechanically continuous ridges (i.e. without incisions), since the opposite walls of the incisions are at least locally blocked against one another to prevent any relative movement in directions parallel to said walls (i.e. other than perpendicular to these walls).

Preferably:
the total length Lt is at least equal to one-third of the width L of the ridge;
each incision portion making an average angle β at most equal to 15° has, in projection on the longitudinal direction of the tread, a length between one-quarter and half the mean distance between two incisions;
to improve the blocking still further, each incision portion making an average angle β at most equal to 15 has, in projection on the longitudinal direction of the tread, a length at least equal to one-fifth the width of the ridge;
the walls of incisions making an average angle β at most equal to 15° are provided with relief elements over at least 50% of the maximum depth of the incision from the rolling surface in the new condition; advantageously, these relief elements (concave or raised) are distributed along at least three lines whose level is essentially parallel to the rolling surface;
the average angle β is at most equal to 5°, to achieve even more effective blocking of movements in the longitudinal direction of the incision walls;
all the incision portions are provided with relief elements on their walls, these relief elements being designed to cooperate between themselves to block all movements along directions parallel to said walls.

The tread according to the invention functions almost identically to the same tread provided with a pattern formed of ridges, while having a number and total length of edges in the contact zone which confer upon the tread a greatly superior grip performance. In effect, all relative movements of one wall relative to the wall opposite, except for their moving apart, are very markedly reduced or even prevented entirely, whether a rib provided with such incisions is subjected in the contact zone to tangential longitudinal (circumferential) or transverse forces, or to a combination of such forces.

Besides, it has been found that a tread pattern according to the invention does not suffer additional wear and in particular that it does not suffer irregular wear (i.e. the wear observed is essentially uniform over the entire contact surface of the ridges).

The relief elements (projections and concavities) can have any geometrical shape, but it is preferable for these shapes to be similar so as to allow even more effective cooperation. It is of course possible to form only projections on one wall delimiting an incision and only concavities complementary to the projections on the opposite wall.

To achieve still better blocking, it is advantageous to distribute over the entire width of the ridges the presence of incision portions that make average angles β at most equal to 15°. To do this, and if it is noted that:

Le: maximum distance separating the incision portions which comprise relief elements and are located closest to the lateral faces of each ridge, and Li: maximum distance separating the incision portions which comprise relief elements and are located closest to the median portion of each ridge, it is advantageous for these distances to satisfy the following relationships:

$$\frac{1}{3} \leq Le/L \leq \frac{2}{3}$$

$$\frac{1}{4} \leq Li/L$$

BRIEF DESCRIPTION OF THE DRAWINGS

Other characteristics and advantages of the invention emerge from the description given below with reference to the attached drawings, which show embodiments of the object of the invention presented as non-limiting examples.

In the drawings:

FIG. 1, illustrating a first variant, is a plan view of a ridge in a tread of a tire according to the invention;

FIG. 2 shows a section of an incision in the ridge shown in FIG. 1, along the line II-II;

DESCRIPTION OF THE PREFERRED EMBODIMENTS

Figure 3:
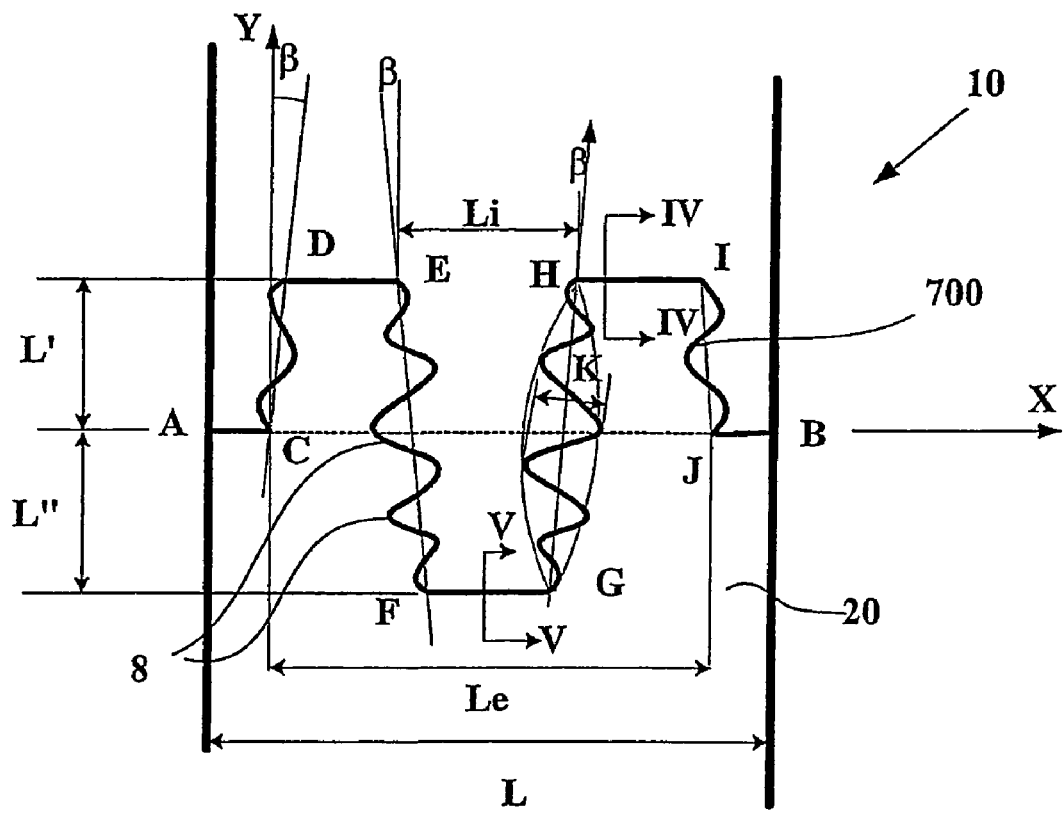
FIG. 3 shows a plan view of a tread ridge in a second variant according to the invention.

FIG. 1 shows a partial view of a ridge 1 of a tread for a heavy vehicle tire of size 315/80 R22.5, comprising a total of eight ridges delimited by grooves with a mean depth of 15 mm, orientated in the circumferential direction of the tread (represented by the direction Y in FIG. 1).

The ridge 1 has a contact face 2 intended to come in contact with the ground during rolling, and two lateral faces 3 and 4 intersecting the contact face 2 along two edges 5 and 6. The ridge 1 is provided with a plurality of incisions 7 opening onto each lateral surface; viewed on the rolling surface of the tire in the new condition, each incision 7 intersects said surface 2 along a line extending between points A and B located on the edges 5 and 6 of the ridge. The average angle of the trace of the incision on the rolling surface corresponds to the angle α between the segment AB and the transverse direction of the tread (marked as direction X in the figure); this angle is in the present case equal to 7°. Each incision in a given ridge has a mean width E of 0.6 mm and virtually constant depth over its length (between points A and B), equal to the depth of the grooves that delimit the ridge 1.

Each incision 7 extends between the lateral face 5 and the other lateral face 6 of the ridge 1 and is formed by a succession of straight incision portions 70, 71, 72, 73, 74 whose intersections with the rolling surface can be seen in FIG. 1.

Two portions 71, 72 of the incision 7 have traces on the rolling surface which make angles with the longitudinal direction of the tread (marked as direction Y in the figure) of β2 and β2 respectively, which are in this case both equal to 7°. These two incision portions 71 and 72 have lengths L1 and L2 both equal to 5 mm, the sum Lt of these lengths projected on the longitudinal direction Y being in this case equal to one-third of the width L of the ridge.

The two incision portions 71 and 72 are in addition provided on the walls delimiting them with a plurality of projecting and concave relief elements rather similar to those described in the patent U.S. Pat. No. 5,783,002. FIG. 2, which is a section along the line II-II in FIG. 1, shows the incision 71 of mean width E and depth Hi. Each wall of the incision 71 has concave and projecting relief elements with a maximum amplitude K equal to 3.3 mm in the present case. In addition, the walls of this incision 71 have concave and projecting relief elements over a total height He in this case equal to Hi. Said relief elements are distributed at several levels between the rolling surface and the bottom of the incision: in practice, and viewed in the direction of the incision's depth Hi, there are preferably at least three rows of relief elements.

In the example presented, the portions 70, 73 and 74 of the incision are also straight and intersect the rolling surface along rectilinear traces which make the same angle α equal to 7. Furthermore, these portions also have a plurality of relief elements similar to those arranged on the portions 71 and 72. In the example described, the direction of rotation is opposite to the direction Y in FIG. 1.

Globally, the incision 1 is perpendicular to the rolling surface in the new condition, i.e. each portion 70, 71, 72, 73, 74 is on average perpendicular to said surface.

As a variant, each incision may be inclined at an angle whose absolute value is at most equal to 15° (relative to the direction perpendicular to the rolling surface); the incisions in a given ridge can be inclined in alternation at a positive and at a negative angle.

Table I below presents a comparison of various patterns having ridges (case 1 to case 4):

without incisions (case 1);

with flat incisions having a rectilinear trace on the rolling surface (case 2);

with flat incisions having a plurality of relief elements as described in U.S. Pat. No. 5,783,002 (case 3);

with incisions according to the present invention (case 4).

In this last case 4, the tire comprises eight ridges each provided with a plurality of incisions such as those shown in FIG. 1. The incisions of the ridge at the shoulder differ from those in the other ridges in that, since the shoulder ridge is wider, these incisions are provided with an additional undulation of larger amplitude To compare these tread patterns (Table I), a rigidity in longitudinal shear (along the direction Y in FIG. 1) is calculated for each of them, equal to the ratio between the longitudinal force exerted by the ground on each pattern and the shear deformation imposed on said pattern. A pliability is also calculated, which is defined as the ratio between the rigidity in longitudinal shear and the product obtained when the shear modulus of the rubber is multiplied by the pattern area in contact with the ground.

A grooving proportion of each tread pattern is defined as the ratio between the sum of the areas of the incisions on a ridge in the new condition and the total area of said ridge.

TABLE I

| Calculated values | | | |
|---|---|---|---|
| | Rigidity in longitudinal shear, in daN/mm | Pliability, in % | Grooving, in % |
| Case 1 | 44.30 | 98.66 | 0 |
| Case 2 | 24.64 | 56.58 | 3 |
| Case 3 | 21.79 | 50.55 | 4 |
| Case 4 | 26.59 | 62.57 | 5.33 |

It is clear that with the pattern according to the invention (case 4) the grooving proportion and length of edges can be increased while also increasing the rigidity in longitudinal shear, compared with what is obtained with patterns having incisions not according to the invention, without on the other hand producing too great a pliability.

Measurements have also been made on tires provided with the same patterns (cases 2, 3 and 4) and a pattern having ridges provided with bridged rectilinear incisions (case 5), i.e. ones whose opposite walls are connected by bridges of rubber. These measurements are shown in Table II below:

TABLE II

| Measurements on tires | | |
|---|---|---|
| | Mean rigidity in longitudinal shear per ridge, in daN/% | Mean grooving proportion per ridge, in % |
| Case 2 | 50 | 3 |
| Case 3 | 55 | 3 |
| Case 4 | 60 | 5.33 |
| Case 5 | 55 | 2.9 |

It is clear that the tread pattern provided with incisions according to the invention (case 4) retains a higher rigidity (expressed in daN per % deformation) than a pattern provided with incisions having bridges, while offering greater grooving regardless of the wear level.

FIG. 3 shows another variant according to the invention of a ridge 10 of a tread comprising a plurality of incisions 700. Viewed on the rolling surface 20, each incision has a trace which extends between two points A and B of intersection with each edge of the ridge. This incision has several successive incision portions going from A towards B, namely: AC, CD, DE, EF, FG, GH, HI, IJ, JB. The incision portions AC, DE, FG, HI are aligned with the transverse direction X and do not have relief elements on the walls which delimit them.

The portions CD, EF, GH, IJ each make an average angle β whose absolute value is 5° relative to the longitudinal direction Y (the angle being that of the segment connecting the points at the ends of each of said incision portions). All these incision portions are provided with a plurality of relief elements throughout their depth (as indicated symbolically by the undulating lines 8 on the rolling surface, as shown in FIG. 3).

To improve the blocking of the walls of longer incision portions, the maximum amplitude K of the relief elements is located towards the median area of each such portion (in the example shown, the amplitude of the relief elements increases progressively from each end towards the median area, as indicated schematically by the dotted lines).

It is advantageous for the incision portions inclined at an angle β smaller than 15° relative to the longitudinal direction of the tread, to be distributed over the width of the ridge in such manner that the blocking of the incision's opposite walls is as evenly distributed as possible over the full width of the ridge. In the present case, the maximum width Le separating the incision portions comprising relief elements and located closest to the lateral faces of each ridge (corresponding to portions CD and IJ and more particularly to the distance between the points C and J), is equal to ⅔ of the width L of the ridge 10, while the maximum width Li separating the incision portions with relief elements located closest to the median part of the ridge, is equal to one-third of the width L.

Advantageously, the incision portions without any relief elements are inclined at a positive and a negative angle relative to a median plane perpendicular to the rolling surface and passing through the point A, this inclination being equal to at most 15°.

Figure 4:
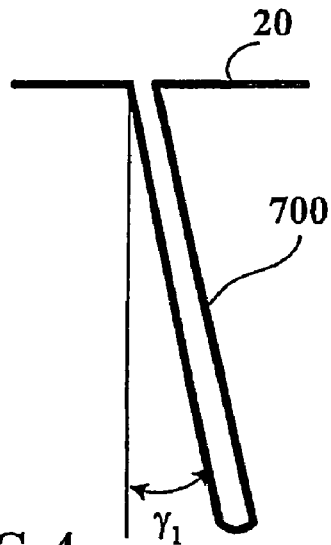
FIG. 4 shows a section of part of an incision in the ridge shown in FIG. 3, along the line IV-IV.
Figure 5:
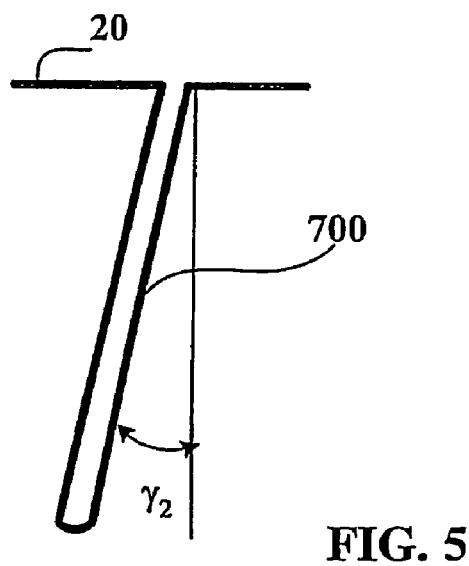
FIG. 5 shows a section of part of the incision in the ridge shown in FIG. 3, along the line V-V.

In the present case, the incision portions DE and HI without relief elements are inclined relative to the plane oriented perpendicular to the rolling surface of the tread in the new condition, as shown in FIG. 4. FIG. 4, which is a section along the line IV-IV in FIG. 3, shows that the trace of the incision portion HI is inclined at an angle $\gamma_1$ relative to a perpendicular to the rolling surface passing through the point of intersection of that portion with said surface. On the other hand, the incision portion FG located on the other side of the segment AB relative to the portions DE and HI, is inclined at an angle $\gamma_2$ of the same value but opposite sign to the angle $\gamma_1$, as shown in FIG. 5, which is a section along the line V-V of said incision portion FG.

If L' and L" denote the distances of the incision points furthest away in the longitudinal direction from the notional line passing through the points A and B and located on either side of this line, various cases are possible. In the example described, L' and L" are essentially equal to one another and to one-quarter of the width L of the ridge.

For better functional equilibrium of the tread and better blocking of the incision walls, it is advantageous for the lengths L' and L" to be weighted according to the incision portions orientated virtually in the longitudinal direction: in the present case, it would be preferable to have L" essentially equal to twice the length of L'.

FIGS. 1 and 3 show ridges provided with incisions according to the invention, with a preferential orientation on said ridges: of course, the same effect can be obtained with a tread pattern in which a plurality of incisions are produced in each ridge, the trace of each incision being essentially symmetrical relative to the line connecting the points of intersection of said incision with the edges of said ridge.

The relief elements may be in the form of grooves and ridges designed to cooperate with one another to ensure the blocking of any movement once the walls of incisions provided with such elements are in contact with one another. The not necessarily rectilinear grooves and ridges are formed on opposite walls along average directions which may or may not be perpendicular to the rolling surface.

Figure 6:
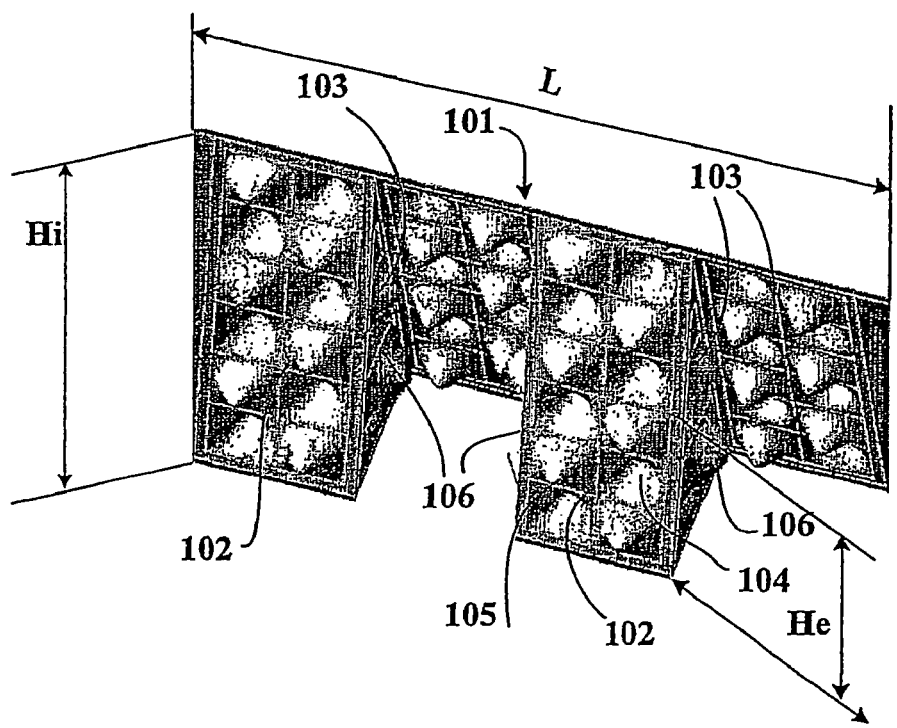
FIG. 6 shows a general view of an element for molding an incision according to the invention.

FIG. 6 shows a variant of a molding element 101 in the form of a lamella designed for fitting in a mould for molding an incision according to the invention in a tire tread. This lamella 101 comprises two oblique parts 102 (i.e. ones designed to mould the parts of incisions that form an angle different from zero with respect to the direction perpendicular to the rolling direction) and radial parts 103 (designed to mould parts of the incision perpendicular to the rolling surface) intercalated.

All these parts of the lamella have the same mean thickness. The total height of the lamella is denoted Hi. All the parts of the lamella have concave 104 and raised 105 elements arranged in alternation, whose amplitude is between 4 and 10 times the average thickness of the lamella.

Some of the radial parts 106 are designed to mould incision portions that form an angle equal to 0 with respect to the longitudinal direction of the tread (the other parts being in this case perpendicular to said direction).

The lamella 101 described is designed for molding an incision whose intersection with the rolling surface has a crenellated geometry, the amplitude of the crenellation increasing progressively with depth (and therefore as the tread becomes more worn). Beyond a certain depth and over at least a residual depth He which is at least equal to half the total height Hi, the radial parts 106 which mould incision portions angled at 0° relative to the longitudinal direction, viewed in projection on said direction, have a total length Lt at least equal to one-fifth of the length L of the lamella (total length means the sum of the lengths in the longitudinal direction of said radial parts).

Figure 7:
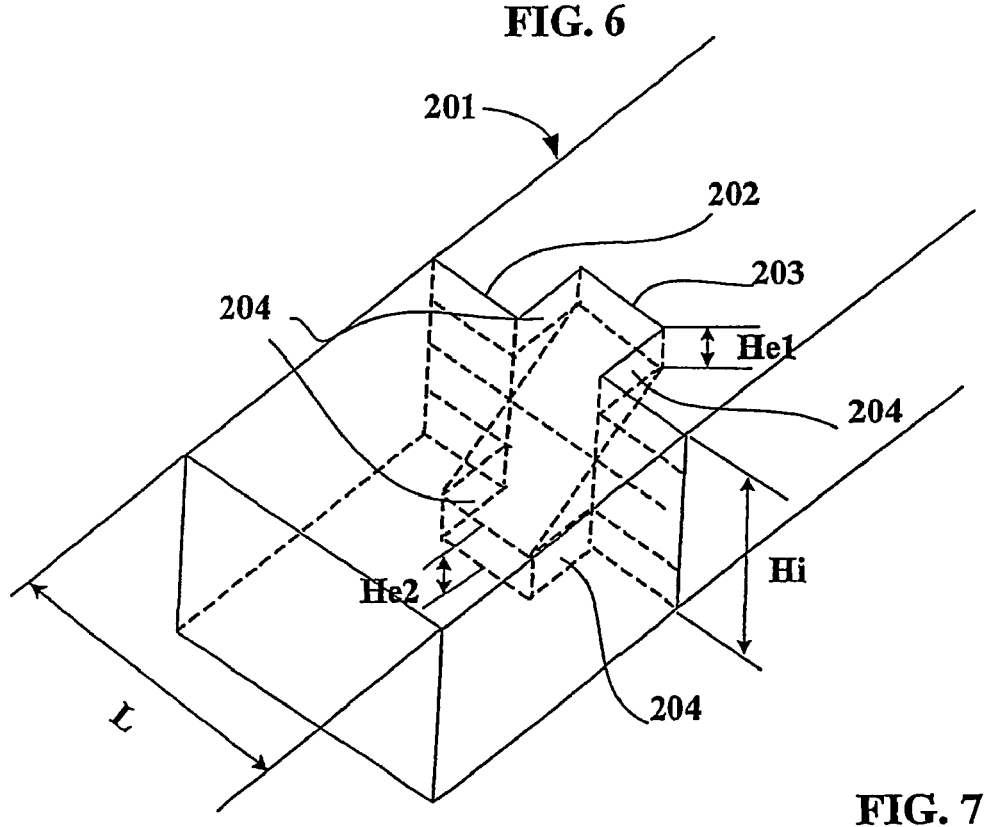
FIG. 7 shows another variant of an incision according to the invention.

Another interesting variant of this last lamella corresponds to the schematic representation of FIG. 7. FIG. 7 represents a rubber element 201 of a tread provided with an incision 202 molded with a lamella fairly similar to that described above.

The particular feature of the incision 202, whose total height is Hi, is that it forms on the rolling surface a geometrical trace 203 which, as wear proceeds, evolves from a crenellated shape with the crenellation located on a first side relative to the segment joining the ends A and B of said incision, to another crenellated shape with the crenellation located on the opposite site relative to the same segment, passing through an intermediate position where the geometrical trace is essentially rectilinear (about half-way down the incision in the case illustrated). The shape of the geometrical trace only begins varying after a depth He1 and continues monotonically until a depth corresponding to a level located a distance He2 from the bottom of the incision.

At least the opposite walls of the incision portions 204 aligned with the longitudinal direction of the rubber element comprise concavities and projections (not shown in this representation), such that the sum of the lengths projected on the longitudinal direction of said portions and on the height He equal to the sum of the heights He1 and He2, is at least equal to one-fifth of the width L of the rubber element 201. Here, the height He is equal to half the total height Hi of the incision.

The invention is not limited to the examples described and illustrated, and various modifications can be made without going beyond its scope. In particular, tires for passenger cars are also concerned, as well as tires for non-driving axles of heavy vehicles.

What is claimed is:

1. A tread for a tire, comprising a tread pattern formed by at least two grooves of generally circumferential orientation, these grooves delimiting at least two ridges each comprising a contact face intended to come in contact with the road and two lateral faces, these lateral faces intersecting the contact face to form edges, at least one of said ridges, of mean width L, comprising a plurality of incisions with maximum depth Hi which, in the new condition, open onto the contact face and onto the two lateral faces of the ridge, the trace of each incision on the contact surface extending between two points of intersection A and B with the edges of the ridge, the segment AB making an angle $\alpha$ with the transverse direction of the tread at most equal to 40°, said tread being characterized in that:

each incision of mean width E, comprises, from one lateral face of the ridge to its other lateral face, a succession of incision portions, some of these incision portions, over at least a height He equal to half the maximum depth Hi of the incision and for any surface parallel to the contact surface in the new condition over said height He, having traces that make, with the longitudinal direction Y of the tread, an average angle $\beta$ at most equal to 15°, said some incision portions, viewed in projection on this longitudinal direction Y, having a total length Lt at least equal to one-fifth of the width L of the ridge; and in that the incision portions whose traces make an average angle $\beta$ are provided on their opposite walls with relief elements of amplitude K designed to cooperate with one another, during passage through the road contact zone, to block the relative movements between one incision wall and the opposite wall in the direction of the thickness of the tread and in the longitudinal direction of the tread, the amplitude K of said relief elements being between 4 and 10 times the mean width E of the incision;

each of other incision portions of said succession of incision portions of the incision extending into the tread in a direction forming an average inclination $\gamma$ smaller than 15° with a plane that is oriented perpendicular to the contact surface of the tread, wherein the respective inclinations $\gamma$ of the other incision portions are opposite one another; wherein each of the other incision portions make an angle with the longitudinal direction which is different than the angle $\beta$.

* * * * *